United States Patent Office 3,382,786
Patented May 14, 1968

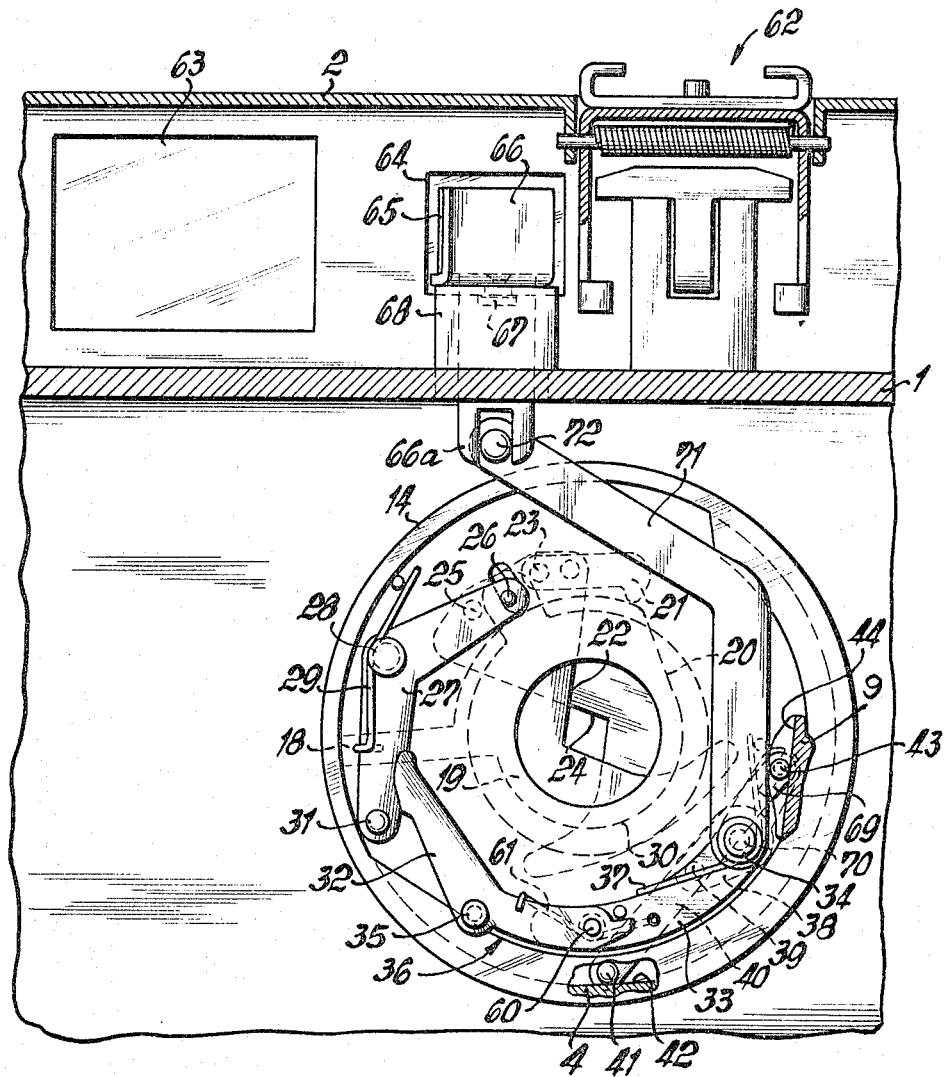

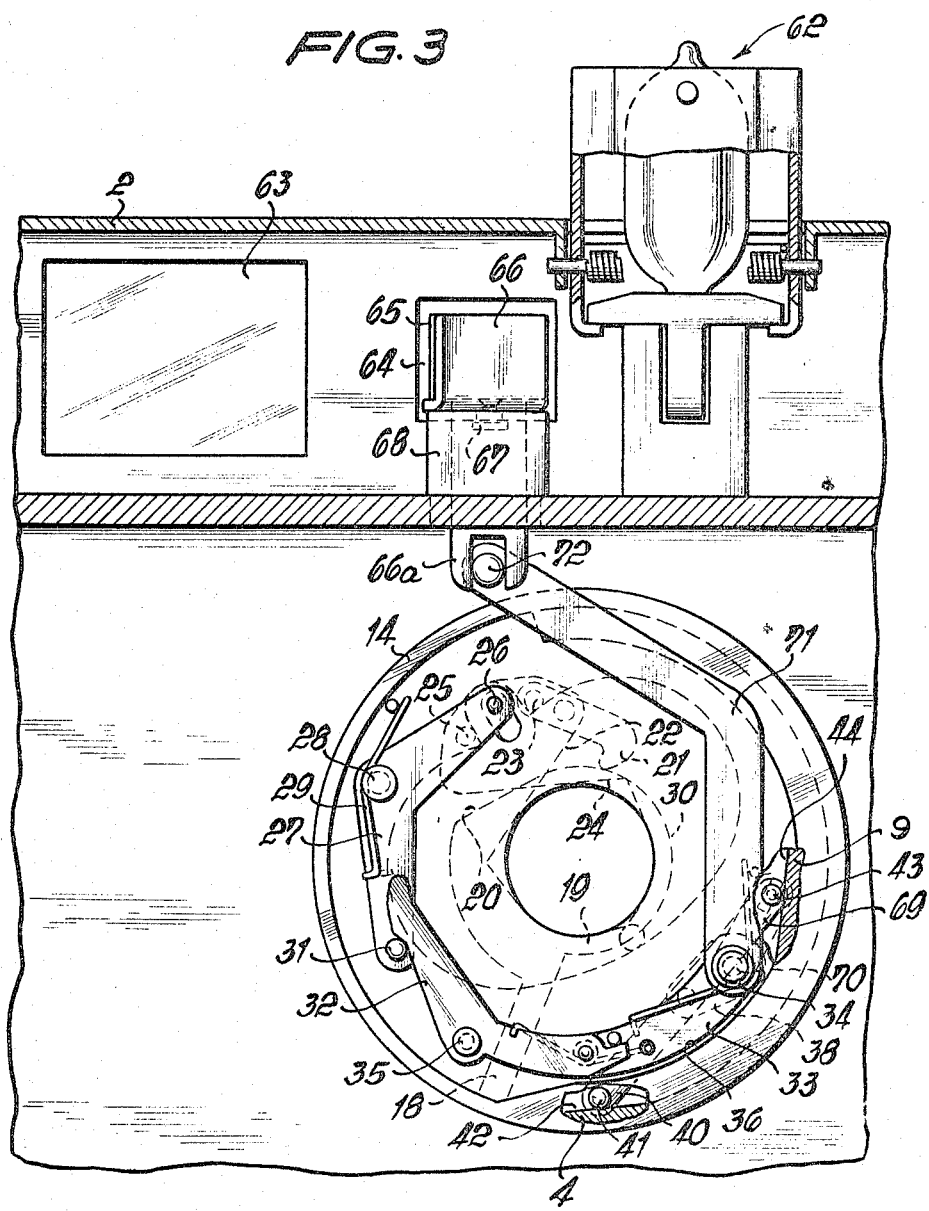

3,382,786
CAMERA WITH AUTOMATIC RANGEFINDER
AND DIAPHRAGM CONTROLS
Herbert Weidner, Volkmarode, and Paul Greger, Braunschweig, Germany, assignors to Voigtlander A.G., Braunschweig, Germany, a corporation of Germany
Filed June 7, 1965, Ser. No. 461,932
Claims priority, application Germany, June 12, 1964, V 26,152
11 Claims. (Cl. 95—64)

ABSTRACT OF THE DISCLOSURE

A camera which is capable of being adjusted according to the distance between the camera and the object which is to be photographed. The camera being capable of automatically setting the camera diaphragm in accordance with the adjustment of the distance between the camera and the object to be photographed and utilizable at least for the purpose of making exposures with flash illumination. This effect is controlled by a single mechanism which is actuated by the distance-setting structure of the camera, the rangefinder at all times and the diaphragm only when exposures are made under flash illumination.

---

Figure 1:
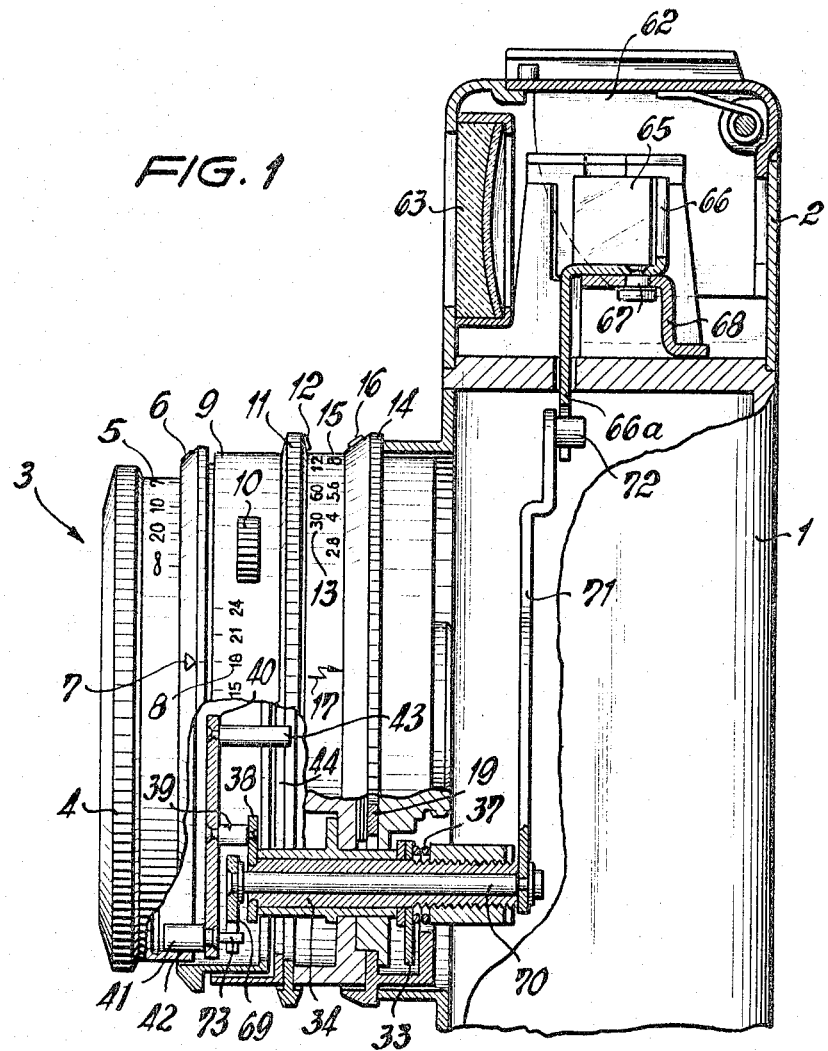

The present invention relates to cameras.

More particularly, the present invention relates to cameras which are capable of being adjusted according to the distance between the camera and the object which is to be photographed, and which in addition are capable of automatically setting the camera diaphragm, in accordance with the adjustment of the distance between the camera and the object to be photographed, at least for the purposes of making exposures with flash illumination. With this type of construction it is possible to render the transmission between the distance-setting structure and the diaphragm operative only when making exposures with flash illumination, so that at other times, such as when making daylight exposures, the transmission is inoperative and the diaphragm can be manually set.

With known cameras of this type the distance-setting structure operates a cam which serves exclusively to control the diaphragm according to the distance-setting, so that in this way it is possible to achieve, with flash exposures, an automatic setting of the camera which will be in accordance with the particular flash guide number.

Cameras are also known in which a rangefinder is provided to be controlled also by the distance-setting structure of the objective, through a suitable cam, so that in this way the operator can accurately set the camera for the particular distance between the camera and the object to be photographed.

A primary object of the present invention is to provide for cameras of the above type, which is to say cameras having automatic diaphragm control during flash exposures and so-called coupled rangefinders, an exceedingly simple and effective structure for controlling both the diaphragm and the rangefinder.

More particularly, it is an object of the present invention to control from a single cam means, which is actuated by the distance-setting structure of the camera, the rangefinder at all times and the diaphragm only when making exposures with flash illumination.

Thus, the objects of the present invention include a structure which requires a relatively small number of components and which is exceedingly compact so that the best possible use is made of the relatively little space which is available in a camera, particularly within the objective thereof.

Furthermore, it is an object of the invention to provide a structure of the above type which is exceedingly simple to assemble and operate and which at the same time is subjected to very little wear so that a long operative life for the structure is assured.

In cameras of the above general type, it is required to control the diaphragm, during flash exposures, not only according to the distance between the object and the camera, but also according to the speed of the film which is in the camera, and a particular problem is involved in avoiding conflict between the film-speed setting structure and the rangefinder-setting structure. The objects of the present invention also include the provision of a simple compact assembly which will reliably avoid any possible conflict between the film-speed setting structure and the rangefinder-setting structure.

A further particular problem which is encountered in cameras of the above type is that of preventing inaccurate rangefinder settings as a result of maintaining the diaphragm-setting structure in an inoperative position when exposures other than flash exposures are made. The objects of the present invention also include the provision of a structure which will reliably prevent the placing of the diaphragm-setting structure in an inoperative position from having any influence whatsoever on the accurate setting of the rangefinder.

The invention is illustrated by way of example in the accompanying drawings which form part of the application and in which:

FIG. 1 is a fragmentary partly sectional side elevation of one possible construction of a camera according to the present invention;

FIG. 2 is a fragmentary rear elevation of the structure of FIG. 1 showing the parts in a position where the diaphragm is capable of being manually set; and FIG. 3 is a fragmentary rear elevation showing the structure of FIG. 2 in the position it takes when the diaphragm is capable of being automatically set in accordance with actuation of the distance-setting structure and the film-speed setting structure.

Referring now to the drawings, there is fragmentarily illustrated therein the housing 1 of a still camera, this housing 1 carrying at an upper portion thereof a hollow enclosure 2 which extends over the top wall of the housing 1 and is connected thereto to form therewith a compartment for housing various units, as is well known.

Referring to FIG. 1, the objective assembly 3 includes the outer tubular structure for carrying the lenses as well as a between-the-lens shutter assembly. This objective unit 3 includes a rotary ring 4 capable of being turned by the operator for setting the distance between the camera and the object to be photographed, this ring 4 carrying a distance scale 5 which is movable with respect to a stationary index 6 carried by a stationary part of the unit 3. Thus, the parts 4–6 form part of a distance-setting means for the camera. The stationary structure which carries the index 6 carries an additional index 7 wich cooperates with a scale 8 of film-speed values, this latter scale of film speeds being carried by a rotary ring 9. The parts 7–9 thus form components of a film-speed setting means of the unit 3, and in order to facilitate turning of the adjusting ring 9, this ring fixedly carried projections 10 capable of being engaged by the fingers of the operator. The unit 3 further includes an exposure-time setting ring 11 which carries an index 12 capable of cooperating with a stationary scale 13 of exposure times. The unit 3 further includes a manually turnable diaphragm-setting ring 14 which carries an index 16 capable of being set with respect to the graduations of a stationary scale 15 of aperture sizes. In addition, it is possible to turn the ring 14 of the diaphragm-setting means to a position where its index 16 is aligned with a flash symbol 17, and this is the position to which the ring 14 is turned by the operator when making exposures with flash illumination.

Referring now to FIGS. 2 and 3, it will be seen that the diaphragm-setting ring 14 is fixed with an inwardly extending, substantially radial extension 18 which carries at its inner end an annular cam 19 provided at its outer periphery with a diaphragm-setting camming portion 20. This camming periphery 20 of the cam 19 is engaged by a free end of a control arm 21 which is fixed with one of the diaphragm blades 22, the illustrated diaphragm including two blades. This diaphragm blade 22 is supported for rotary movement about a stationary pin 23 which acts at the same time as a support which mounts the control arm 21 for pivotal movement. The second diaphragm blade 24 is supported for pivotal movement by a stationary pin 25 which extends parallel to the pin 23, these latter pins being carried by any suitable stationary structure of the objective. In a known way, both of the blades 22 and 24 are formed with control slots which cross over each other. At the place where these slots cross over each other there is a control pin 26 which extends through both slots and which is parallel to the pivot pins 23 and 25. This pin 26 thus couples the blades 22 and 24 to each other in such a way that they will simultaneously move through equal distances but in opposite directions. The control pin 26 is fixedly carried by one end of a control lever 27 which is supported for turning movement by a pivot pin 28 which is also carried by any stationary wall of the objective unit. A spring 29 acts on the lever 27 so as to urge the latter to turn in a counterclockwise direction, as viewed in FIGS. 2 and 3. Therefore, the spring 29 through its action on the lever 27 urges the pin 26 to move in a direction which will maintain the free end of the control arm 21 in engagement with the periphery of the cam 19.

The parts are illustrated in FIG. 2 with the diaphragm-setting ring 14 and with the cam 19 fixed thereto in a position in which the camming edge 20 situates the control arm 21 and with it the blade 22, and of course the blade 24 which is coupled by the pin 26 to the blade 22, in a position where the blades 22 and 24 provide the smallest aperture which is possible with the illustrated diaphragm. When the ring 14 and cam 19 are turned about the optical axis in counterclockwise direction, as viewed in FIGS. 2 and 3, the arm 21 will under the action of the spring 29 follow the curvature of the camming edge 20 so as to displace the blades 22 and 24 to a position providing larger apertures, until the largest possible aperture for the particular diaphragm is achieved, and in this manner the manual setting of the diaphragm by cooperation of the index 16 with the scale 15 is achieved.

When the diaphragm-setting ring 14 is turned so as to displace the index 16 beyond the graduation indicating the largest possible diaphragm aperture of the scale 15, this index 16 will reach the flash symbol 17, and this is the operation which takes place when it is desired to make flash exposures. At this time, a camming edge 30 of the cam 19, which is situated beyond the camming edge 20 thereof, is displaced into engagement with the end of the control arm 21. The camming edge 30 extends along a circle whose center is in the optical axis, so that the result of displacing the camming edge 30 into engagement with the control arm 21 is to maintain the latter at a position where its inner free end, which engages the outer periphery of the cam 19, remains closest to the optical axis, thus providing the largest aperture which is illustrated in FIG. 3.

This displacement of the ring 14 from its manual diaphragm-setting position, shown in FIGS. 1 and 2, to the flash position of FIG. 3, results in coupling of the distance-setting structure and film-speed setting structure of the camera to the diaphragm for automatically controlling the latter. The diaphragm will then be automatically set in accordance with the particular flash guide number.

During manual setting of the diaphragm the lever 27 of course turns about its pivot 28. When the diaphragm is set at its largest aperture a pin 31 which is carried by the lever 27 approaches and moves into engagement with a lever portion 32 of a two-part lever which includes a second lever portion 33. These lever portions 32 and 33 form part of a diaphragm-setting transmission means as will be apparent from the description which follows. The lever portions 32 and 33 are pivotally connected to each other by a pivot pin 60. A spring 61 is coiled at an intermediate portion thereof about the pin 60 and engages with its ends the lever portions 32 and 33, respectively, in the manner illustrated in FIGS. 2 and 3, so as to urge the lever portion 32 to turn about the pin 60 in a counterclockwise direction with respect to the lever portion 33, as viewed in FIGS. 2 and 3, and thus the spring 61 seeks to maintain the lever portion 32 in a position where it forms an extension of the lever portion 33. As may be seen from FIGS. 2 and 3, the lever portion 32 is provided to the right of the pivot 60 with a free end portion which engages a pin carried by the lever portion 33, so that the counterclockwise turning of the lever portion 32, as viewed in FIGS. 2 and 3, with respect to the lever portion 33 is limited by this free end of the lever portion 32 and the pin which is carried by the lever portion 33, and it is in this extended position that the lever portion 32 is yieldably maintained by the spring 61.

The lever portion 33 is fixed, at its end distant from the lever portion 32, to a rotary shaft 34 which extends into the objective unit 3 and which extends through the shutter assembly therein, the shaft 34 being hollow and supported for rotation about its axis by any suitable bearings. The lever portion 32 carries a pin 35 which has an eccentric portion projecting laterally beyond a side face of the lever 32, and this eccentric portion of the pin 35 engages an inner edge portion 36 of the ring 14, in the position of the parts shown in FIG. 2. Changing the angular position of the pin 35 will adjust its eccentric portion with respect to the edge 36 so that cooperation between the ring 14 and the pin 35 can be adjusted. Thus, in the position of the part shown in FIG. 2, which is the position which the parts take for manual setting of the diaphragm, the inner edge portion 36 of the ring 14 cooperates with pin 35 to maintain the lever portion 32 in a position where it is beyond the range of the pin 31 of the lever 27, so that at this time, in the manual setting range of the diaphragm, the lever portion 32 is maintained at a position where it can have no influence on the setting of the diaphragm.

A spring 37 is coiled about the shaft 34 and engages at one of its ends the lever portion 33 so as to seek to turn the latter together with the shaft 34 in a counterclockwise direction, as viewed in FIGS. 2 and 3. The result is that the spring 37 also seeks to displace the lever portion 32 outwardly away from the optical axis so as to maintain the pin 35 in engagement with the edge 36. When the diaphragm-setting ring 14 is turned from the position of FIG. 2 into the flash-exposure position of FIG. 3, the edge 36 of the ring 14 moves beyond the range of movement of the pin 35. The lever 32, 33 can therefore be moved at this time, together with the shaft 34, in such a way that the lever portion 32 by acting on the pin 31 can move the control lever 27. This movement of the lever 27 will result in displacement of the pin 26 so as to situate the diaphragm blades 22 and 24 in a corresponding position, and in this way when the diaphragm ring 14 is placed in a position for making flash exposures the diaphragm-setting transmission means formed by the shaft 34, the levers 32, 33 and 27, and pin 26 is rendered operative. During the turning of the lever 27 in a clockwise direction, from the position thereof shown in FIG. 3, the lever 21 will be displaced away from the camming periphery of the diaphragm-setting cam 19 so that the extent to which the aperture is reduced will be determined by the structure which turns the shaft 34 and the lever 32, 33 therewith.

The coupling lever 32, 33 and the shaft 34 therewith are turned, in order to automatically determine the diaphragm-setting during flash exposure, by the distance-setting means and the film-speed setting means of the camera.

For this purpose the shaft 34 fixedly carries a lever 38 provided at its free end, which is distant from the shaft 34, with a pin 39 on which a lever 40 is mounted, intermediate its ends, for free turning movement. This lever 40 carries at one of its ends, the lower end as viewed in the drawings, a cam-follower pin 41 which engages the camming surface of a distance cam means 42 which is fixed to the distance-setting ring 5 for turning movement therewith. The other end of the lever 40 carries a cam-follower pin 43 which engages the camming surface of a film-speed cam means 44 carried by the film-speed setting ring 9 for turning movement therewith. The spring 37 which acts to turn the shaft 34 in a counterclockwise direction, as viewed in FIGS. 2 and 3, thus also acts to turn the lever 38 in the same direction with the result that the pin 39 is always urged downwardly toward the right, as viewed in FIGS. 2 and 3, and thus the cam-follower pins 41 and 43 are at all times urged against the camming surfaces of the pair of cam means 42 and 44, respectively.

During turning of the ring 9 so as to set the factor of the film speed into the camera, the film speed cam means 44 turns with the ring 9 and acts on the cam-follower pin 43 to displace the latter together with the lever 40 about the axis of the pin 41 which at this time does not change its position with respect to the distance cam means 42. In this way, the lever 40 is turned to a given angular position in accordance with the film speed. When the distance-setting ring 5 is turned, the distance cam means 42 will turn therewith so as to act on the cam-follower pin 41 to turn the lever 40 about the axis of the pin 43, and thus the angular position of the lever 40 will be changed in this way in accordance with the distance setting, so that at any given time the particular angular position of the lever 40 is indicative not only of the distance setting but also of the film-speed setting. These changes in the angular position of the lever 40 will produce corresponding changes in the angular position of the lever 38 together with the shaft 34, and the turning of the shaft 34 will cause the lever 32, 33 to act on the lever 27 so as to place the diaphragm blades 22 and 24 automatically in a position providing an aperture determined by the particular distance-setting and film-speed setting of the camera. In this way it is possible to automatically set the camera according to the light intensity of the particular flash apparatus which is used therewith. At this time any change in the distance setting will change the diaphragm setting automatically in a manner which is correct for a particular flash guide number. When the film-speed setting is changed by turning the ring 9, then there will also be a corresponding change in the setting of the diaphragm, the lever 40 turning at this time about the axis of the pin 41, as pointed out above. The position of the film-speed cam means 44 with respect to the cam-follower pin 43 changes at this time. Thus, in this case also the position of the pin 39 will change with respect to the axis of the shaft 34 so that the latter turns and changes the setting of the diaphragm in the manner described above.

When the ring 14 is returned from the flash position of FIG. 3 to the manual position of FIG. 2, the inner edge portion 36 of the ring 14 engages the eccentric pin 35 so as to turn the lever portion 32 to a location where it will have no influence on the diaphragm and where the largest possible diaphragm aperture will be provided if the pin 31 should engage the lever 32. It should be noted that the spring 37 is more powerful than the spring 61, so that if necessary the spring 61 will yield while the spring 37 maintains the cam-follower pins 41 and 43 in engagement with the cams 42 and 44, respectively. Thus, when the edge 36 of the ring 14 engages the eccentric pin 35 the lever portion 32 can turn in a clockwise direction, as viewed in FIGS. 2 and 3, in opposition to the spring 61, while the position of the lever portion 33 remains unchanged. In this way the diaphragm-setting transmission means which automatically sets the diaphragm during flash exposures is rendered inoperative during manual setting of the diaphragm. Now the manual setting of the diaphragm will take place by engagement of the camming periphery 20 of the cam 19 with the control arm 21, in the manner described above.

The illustrated camera carries a flash apparatus 62 which is shown in FIGS. 1 and 2 in its rest position and in FIG. 3 in its operative position ready to provide a flash illumination. In the illustrated example, the flash assembly utilizes conventional flash lamps, but it is of course also possible to use either a partly or fully built-in electronic flash assembly.

The camera of the invention is also provided with a built-in range finder. In the illustrated example, this range finder is of the type which includes a turnable reflector. For this purpose there is situated within the enclosure 2 at the upper part of the camera, beside the view-finder window 63 thereof, the range finder window 64 behind which is located the turnable reflector 65. This reflector 65 is mounted on a carrier 66 capable of turning about a vertical axis, as viewed in the drawings, this turning movement of the carrier 66 together with the reflector 65 being provided by a vertical pivot pin 67 which is supported for turning movement about a vertical axis, as viewed in the drawings, and which is carried by a stationary bearing block 68 of the camera, mounted on the camera housing 1 thereof.

In accordance with the invention, the turnable reflector 65 is controlled by the same cam means 42 which cooperates with the cam-follower pin 41 for setting the diaphragm in accordance with the distance when exposures are made with flash illumination. Of course, it is possible to use, instead of a range finder with a turnable reflector, any other known range finder structure such as range finders which include tiltable or rotary prisms or which provide split images, and in any of these cases the movable component of the range finder assembly is controlled through a range finder-setting transmission means of the invention, described in greater detail below, from the cam means 42 which is the distance cam means set in accordance with the manual setting of the ring 4. Moreover, with the structure of the invention, this transmission means which controls the range finder is always operative, even though the transmission means for setting of the diaphragm is only operative when making an exposure with flash illumination.

In the illustrated example, the transmission means for setting the range finder includes a bifurcated lever 69 which is fixed to one end of a shaft 70 which extends coaxially through the hollow shaft 34 so as to be guided for rotary movement thereby. The other end of the shaft 70 of the range finder-setting transmission means fixedly carries a control lever 71 which at its top end fixedly carries a pin 72 received within an elongated, vertically extending notch formed at the lower end portion of the control arm 66a of the reflector-carrier 66. The clearance of the pin 72 within the notch of the lever portion 66a, while slight, is nevertheless great enough to prevent any binding during the turning of the lever 71 which displaces the pin 72 so as to cause the lever 66 to turn about the axis of the pin 67 and thus change the angular position of the reflector 65. The bifurcated lever 69 receives a motion-transmitting pin 73 which forms part of the transmission means for setting the range finder, and it is to be particularly noted that this pin 73 is a coaxial extension of the cam-follower pin 41 so that in effect it is a portion of the pin 41 which acts on the transmission which extends to the range finder.

During actuation of the distance-setting means of the camera the cam means 42 will of course turn with the ring 4, and the result is that the cam-follower pin 41 will have its position relative to the cam 42 changed, so that the lever 40 will turn about the axis provided by the pin 43 which at this time does not move relative to the cam 44. The extension 73 of the pin 41 of course moves with this pin, so that the lever 69 is turned in order to turn the shaft 70 and thus turn the lever 71, this shaft 70 turning within the hollow shaft 34. The shifting of the pin 72, which moves with the lever 71, will of course turn the lever 66 about the axis of the pivot pin 67, and in this way the distance-setting ring 4 will have its rotary movement transmitted to the tiltable reflector 65 so that when the operator looks through the view-finder he will, in a well known manner, be capable of setting the distance between the camera and the object to be photographed.

It is to be noted that this control of the range finder takes place when the structure is in the flash-exposure position of FIG. 3 as well as in the daylight-exposure position of FIGS. 1 and 2, since the position of the lever portion 32 has no influence on the position of the cam-follower pin 41.

Moreover, it is to be noted that when the camera is in the position of FIG. 3, for making flash exposures, and the film-speed setting is changed, because the lever 40 turns about the axis of the pin 41, the range finder setting will not be influenced in any way, inasmuch as the extension 73 of the pin 41 is coaxial with the latter, so that a change in the film-speed setting will have no influence on the range finder.

It will be seen, therefore, that with the structure of the invention the same cam means 42 is used not only for participating in the setting of the diaphragm during flash exposures but also to control the range finder, so that instead of using two cams for these purposes, a single cam is used with a consequent saving in the number of elements and with a much more compact construction. Moreover, it is furthermore to be noted that only a single cam-follower pin 41 cooperates with the cam 42 which controls both the diaphragm and the range finder, so that in this way there is no possible conflict between a pair of pins which cooperate with a single cam and in addition there is no possible conflict between such a pair of pins.

A further particularly noteworthy feature of the invention resides in making the shaft 34 hollow so that the shaft 70 can extend therethrough and be supported thereby for rotary movement. This feature provides an exceedingly compact assembly which enables the shafts 34 and 70 to extend without difficulty into the interior of the objective unit 3 where space is of course at a premium. With this arrangement the part of the range finder-setting transmission means which extends into the objective assembly requires practically no additional space.

Furthermore, if the lever 32, 33 were made of one piece, the displacement of the lever to its inoperative position by engagement of the edge 36 of the ring 14 with the pin 35 might turn the shaft 34 so as to displace the cam-follower pins 41 and 43 to undesirable positions where one of these pins, for example, might not even engage the cam with which it cooperates. In this way, when the transmission to the diaphragm is rendered inoperative a faulty setting of the range finder might result. However, with the structure of the invention by making the lever in two parts 32 and 33 connected to each other by a spring 61 which is weaker than the spring 37, an accurate permanent control of the range finder by the distance-setting means is guaranteed even when the lever portion 32 is displaced to its inoperative position where it can have no influence on the manual setting of the diaphragm.

Of course, with this construction the pin 35 which is acted upon by the inner edge 36 of the ring 14 is carried by that part of the lever 32, 33 which is distant from the shaft 34.

Of course, the invention is not limited to the specific details described above and shown in the drawings. For example, the invention can also be used with a construction where the changeover from manual setting of the diaphragm to automatic setting thereof during flash illumination takes place by a special selecting lever rather than by turning the ring 14. Also, while it would be possible to provide for the range finder-setting transmission means, a separate pin which engages the cam 42, the illustrated construction is preferred for the reasons pointed out above. In accordance with the particular space which is available in any given camera, the various transmissions can of course have their configurations altered.

All of the details shown in the drawings and described above can of course be combined together in any desired combinations.

What is claimed is:

1. In a camera, a diaphragm, distance-setting means for setting the distance between the object to be photographed and the camera, cam means operatively connected to said distance-setting means to be controlled thereby in accordance with the distance set by said distance-setting means, diaphragm-setting transmission means actuated by said cam means and operatively connected to said diaphragm for setting the latter in response to operation of said distance-setting means, means operatively connected to said diaphragm-setting transmission means for rendering the latter operative only during exposure with flash illumination, a range finder, and a range finder-setting transmission means cooperating with said cam means and said rangefinder for setting the latter whenever said distance-setting means is operated, whereby said cam means functions not only to actuate said diaphragm-setting transmission means during exposure with flash illumination but also to actuate said range finder-setting transmission means at any time.

2. In a camera as recited in claim 1, said diaphragm-setting transmission means including a lever carrying a cam-follower pin which engages said cam means, and a second pin carried by said lever and forming part of said range finder-setting transmission means so that the latter is actuated by cooperation of said cam-follower pin with said cam means.

3. In a camera as recited in claim 2, said second pin being coaxial with and forming an extension of said cam follower pin.

4. In a camera as recited in claim 2, said diaphragm-setting transmission means including in addition to said lever and cam following pin a first shaft operatively connected to said lever to be turned thereby and a second lever operatively connected to said first shaft to be turned thereby so as to transmit movement thereof toward said diaphragm, said first shaft being hollow, and a second shaft forming part of said rangefinder-setting transmission means and extending through said first shaft, said second shaft carrying at one end a lever actuated by said second pin and at its opposite end an additional lever for transmitting rotation of said second shaft to the range finder.

5. In a camera as recited in claim 4, said second lever of said diaphragm-setting transmission means including a pair of lever portions pivotally connected to each other and a spring operatively connected to said lever portions for maintaining them substantially in relative positions where they form extensions of each other, one of said lever portions being distant from said first shaft and said means for rendering said diaphragm-setting transmission means operative only during exposure with flash illumination engaging said one lever portion which is distant from said first shaft to displace the latter to a position where it cannot transmit motion to the diaphragm when an exposure other than with flash illumination is to be carried out, whereby the lever portion which is directly connected with said first shaft remains in an unchanged position even when the diaphragm-setting transmission means is inoperative to provide for continued transmission of said distant-setting means through said rangefinder-setting transmission means to the range finder.

6. In a camera as recited in claim 5, diaphragm-setting means operatively connected to the diaphragm for setting the latter, a cam carried by said diaphragm-setting means for movement therewith, and a pin carried by said lever portion which is distant from said first shaft and situated in the path of movement of said latter cam to be displaced thereby either to an operative or an inoperative position, so that said cam of said diaphragm-setting means forms the means for rendering the diaphragm-setting transmission means operative or inoperative.

7. In a camera as recited in claim 6, said pin which is connected to said lever portion distant from said first shaft is eccentric so that its position relative to the cam of said diaphragm-setting means can be adjusted.

8. In a camera, rotary distance-setting means for setting the distance between the camera and the object to be photographed, cam means operatively connected with said distance-setting means to be adjusted thereby according to the position of said distance-setting means, a single cam-follower pin engaging said cam means, and a pair of transmission means operatively connected to said cam-follower pin to be actuated thereby, one of said transmission means actuating a rangefinder of the camera and the other of said transmission means setting a diaphragm of the camera during exposure with flash illumination.

9. In a camera as recited in claim 8, the transmission means which is operatively connected with said pin for setting the diaphragm during exposure with flash illumination including a lever having a pair of elongated portions pivotally connected to each other, first spring means operatively connected with one of said lever portions for urging the latter to a position maintaining said pin at all times in engagement with said cam means, and second spring means operatively connected with the other of said lever portions for maintaining the latter in a position for transmitting movement to a diaphragm of the camera, said second spring means being weaker than said first spring means, and means engaging said other lever portion for moving the latter in opposition to said second spring means to a position preventing transmission of motion to the diaphragm of the camera, whereby the transmission to the range finder will remain operative whether or not the transmission to the diaphragm is operative or inoperative.

10. In a camera as recited in claim 9, one of said transmission means including an elongated hollow shaft and the other of said transmission means including an inner shaft extending through the hollow shaft, so that the pair of transmissions form a compact assembly at said shafts thereof.

11. In a camera, distance-setting means for setting the distance between the camera and the object to be photographed, distance cam means operatively connected to said distance-setting means for movement therewith, film-speed setting means for introducing the factor of film speed into the camera, film-speed cam means operatively connected to said film-speed setting means for movement therewith, a pair of cam-follower pins respectively engaging said distance cam means and said film-speed cam means, a lever extending between and carrying said pins, means acting on said lever for constantly urging both of said pins toward both of said cam means simultaneously for producing turning of said lever about the axis of said pin which engages said distance cam means when said film-speed setting means is actuated and for producing turning of said lever about the axis of the pin engaging said film-speed cam means when said distance-setting means is actuated, said pin which engages said distance cam means having a coaxial extension, and transmission means actuated by said extension for adjusting a rangefinder of the camera in response to movement of said distance-setting means, whereby operation of said film-speed setting means will have no influence on the range finder.

References Cited

UNITED STATES PATENTS

| 2,974,577 | 3/1961 | Fahlenberg | 95—44 XR |
| 3,118,356 | 1/1964 | Sauer et al. | 95—64 XR |
| 3,344,723 | 10/1967 | Rentschler | 95—10 |

FOREIGN PATENTS 544,207  6/1956  Italy.

NORTON ANSHER, *Primary Examiner.*

J. F. PETERS, *Assistant Examiner.*